April 27, 1965 G. M. GRADY 3,180,462
JOINT OR LOUVER CONSTRUCTION
Filed June 14, 1962
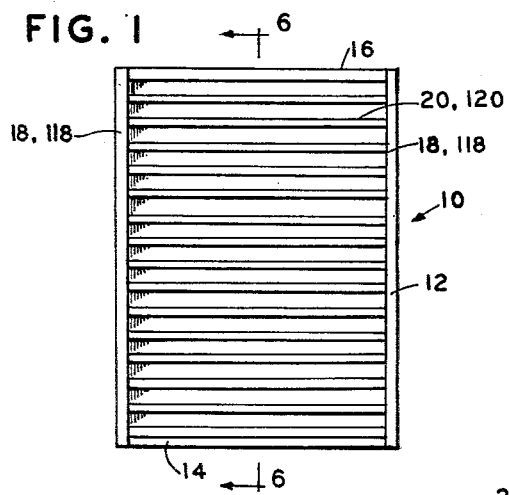
FIG. 1
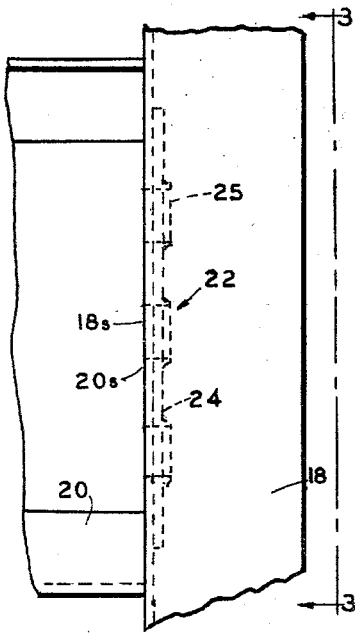
FIG. 2
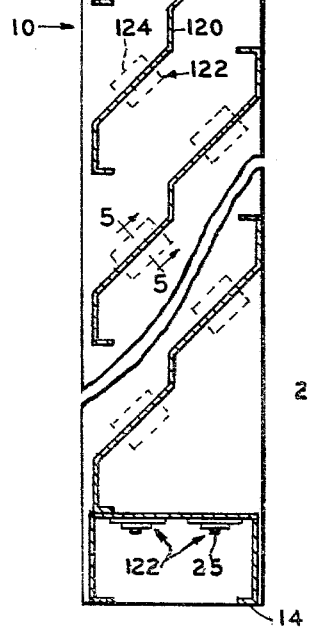
FIG. 6
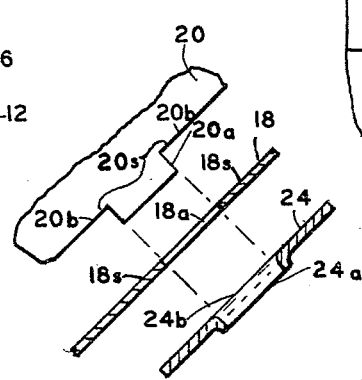
FIG. 4
FIG. 5
FIG. 3
INVENTOR.
GEORGE M. GRADY
BY Jack M. Young
ATTORNEY United States Patent Office 3,180,462
Patented Apr. 27, 1965

3,180,462
JOINT OR LOUVER CONSTRUCTION
George M. Grady, Minneapolis, Minn., assignor to Hupp Corporation, Cleveland, Ohio, a corporation of Virginia
Filed June 14, 1962, Ser. No. 202,513
4 Claims. (Cl. 189—36)

The present invention relates to a joint, and especially to a joint for a louver, door, or any other construction or assembly.

An object of the present invention is to provide a welded joint securing two metal members together without heat discoloration of exposed surfaces.

A further object of the present invention is to provide a louver, or other type assembly, where the component members thereof are securely welded together but the surfaces thereof, exposed to view when the louver or assembly is installed, are not heat discolored by the welds.

A further object of the present invention is to provide a joint or louver characterized by its compact construction, structural simplicity, minimum number of component parts, low manufacturing cost, strong and sturdy nature, ease of assembly, uniformly colored (and not discolored) exterior appearance, and attractive exterior appearance.

These and other objects of the present invention will become more fully apparent by reference to the appended claims as the following detailed description proceeds in reference to the accompanying drawing wherein:

FIGURE 1 is a front view of a louver generic to both illustrated forms of the present invention;

FIGURE 2 is an enlarged view of a right hand portion of the first form of the louver shown in FIGURE 1;

FIGURE 3 is a side elevational view of FIGURE 2 taken generally along the line 3—3 in FIGURE 2;

FIGURE 4 is an exploded view, prior to assembly of the component parts, in FIGURE 2;

FIGURE 5 is a sectional view taken generally along the line 5—5 in FIGURE 3 or 6; and FIGURE 6 is a vertical sectional view taken generally along the line 6—6 in FIGURE 1.

Although the present invention may be used as a joint between members in any assembly, louvers are described herein as some preferred constructions in which to use such joint.

Joints 22 and 122 are shown respectively on two different louver constructions in a first form in FIGS. 2–5 and in a second form in FIG. 6. Each louver form is substantially identical in construction except for the structural differences shown in the parts illustrated.

Louver 10 is shown in FIG. 1 as being generic in structure, as illustrated, to both forms in FIGS. 2–5 and in FIGS. 5–6.

Louver 10 in FIG. 1 is formed from frame 12 and a plurality of interconnected louver blade members 20 or 120. Frame 12 is formed by interconnected frame members, including sill member 14, head member 16, and two parallel and vertical jamb members 18 or 118.

The structure in FIGS. 2–5 will be described first.

Members 14, 16, 18 and 20 can be made of any suitable material but are disclosed herein as being formed of weldable and heat conducting metallic material, such as stainless steel, a common metal used for exterior surfaces in modern commercial office building construction.

The present invention is directed to welded joint 22 used herein for connecting frame members 14, 16 and 18 or 118 at the corners of frame 12; and for connecting opposite ends of louver blade member 20 to jamb members 18 or 118.

If these members were joined together by a conventional welded joint, the material would be discolored so as either to impair the exterior appearance of the building or to require that the exterior surface of the metal be refinished at additional cost to remove the discoloration. If the material is colored rolled stainless steel (stainless steel having color applied to its surface at the steel mill before machining or processing the steel into final shape), has a baked enamel surface, etc., the heat from the weld would burn the finish to cause a brown discoloration so as to require refinishing and repainting of the surface. If the material is a finished metal such as stainless steel, the welded members will be discolored with a brown coating or stain required to be removed by a polishing operation. After the parts are welded in assembled position, the shape of the component parts frequently prevents convenient access to all surface required to be refinished. For example, consider the difficulty of refinishing surface 121 in FIGURE 6. The present invention in joint 22 eliminates this problem and the necessity for refinishing any exposed surfaces after making welded joint 22.

The joint or joint means 22 in FIGS. 2, 3, 4 and 5 is used herein for connecting opposite ends of each jamb member 18 to sill member 14 and head member 16, and connecting opposite ends of each louver blade member 20 to jamb member 18.

This joint 22 resembles the common mortise and tenon wood joint wherein mortise or slot 18a is member 18 in FIGS. 4 and 5 is assembled over tenon, tab or projection 20a on member 20. After tenon 20a is telescoped into mortise 18a in the manner shown from the position in FIG. 4 into the position in FIG. 5, washer 24 is telescoped over the distal end of tenon 20a so as to bear against the outer surface of member 18. Washer 24 has a slot 24b closely straddling projection or tenon 20a by struck up lugs or wings 24a projecting to the right in FIG. 5 from the surface of washer 24, projecting from opposite lengthwise edges of slot 24b, and projecting away from member 18. Lugs or wings 24a are struck up, and formed by a stamping operation during the formation of slot 24b, from the material in washer 24.

Projection or tenon 20a snugly fits slots 18a and 24b to provide a tight assembly. The cross sectional shape of tenon 20a is approximately the same as, but slightly smaller than, each slot 18a or 24b.

The width of projection 20a in FIG. 4 is less than the width of member 20 so as to define one or more shoulders 20b, two of which are being shown in FIG. 4 for purposes of illustration, on member 20 adjacent projection 20a. Such shoulders 20b abut against the inner surface 18s on member 18 as projection 20a extends through slot 18a in the manner shown in FIGS. 3 and 5.

After this assembly has been completed and the component parts are firmly held together, one or more projection welds or spot welds 25 are formed by an electric, or any other suitable welding machine, on the outer ends of wings 24a and projection 20a in FIGS. 2, 3 and 5 in the manner illustrated. These welds join these wings and projection to secure tenon 20a to washer 24 on the side of washer 24 opposite member 18. Then, members 18 and 20 are secured together with a rattle-free joint 22, formed by the close fit and abutting contact between member 18 and shoulders 20b on member 20; and between tenon 20a, slots 18a and 24b, and wings 24a.

Use of one or more joints 22 assures that exposed metal surfaces 18s and 20s respectively on frame members 18 and on louver blade members 20, located within frame 12, and exposed to view when the louver is installed are not heat discolored by welds 25. This is true even if these component members are not formed of metal but only the exposed surface 18s or 20s are formed either of heat conductive material or of a metal having such surface discolorable by heat from any weld formed closely contiguous thereto. If these surfaces are painted or colored, the coloring will not be altered or adversely affected by heat of welds 25. If these surfaces are polished material, an extra manufacturing operation will not be required to remove heat discoloration from welds 25.

Washer 24 is of sufficient size and is constructed so that exposed surfaces 18s and 20s on the side opposite washer 24 will not be heat discolored. This so called "sufficient size" may be provided either by the thickness of the washer 24 spacing welds 25 from surfaces 18s and 20s or by the large mass of washer 24 absorbing the heat before it can discolor surface 18s or 20s. The height of wings 24a, projecting to the right in FIG. 5 from the right-hand planar surface of washer 24, also inhibit heat transfer in the left-hand direction in FIG. 5 from welds 25 to exposed surfaces 18s and 20s.

Although two wings 24a are shown and preferably used, a satisfactory joint may be formed by using only one wing extending from only one side of slot 24b and projected upwardly the same, or a greater distance, from the planar surface of washer 24.

Although the description in the preceding paragraph of the component parts, structure, mode of operation and advantages has been given only of the structure in the first form of the invention in FIGS. 2–5, it will be apparent hereafter that this same description applies generically to the correspondingly named component parts in the second form of the invention in FIG. 6 having the same reference numerals, except in the 100 series, and intended to be used in the assembly in FIG. 1.

The structural differences between these two different invention forms will also be brought out hereafter.

FIGURE 6 shows louver 10 in FIG. 1 comprising jamb members 118 having slot 18a and surface 18s; louver blade members 120 having projection or tenon 20a, shoulder(s) 20b and surface 20s; joint or joint means 122; and washers 124 having lugs or wings 24a and slot 24b corresponding to the similarly named parts in FIGS. 2–5 having the same component portions except where differences in structure are apparent in FIG. 6.

In joining any two members, one or more joints 22 may be used, as many as are believed necessary. For example, three joints 22 are illustrated in FIG. 3 for connecting one end of blade member 20 to jamb member 18, but only one or two joints 122 connect blade member 120 to jamb member 118 in FIG. 6.

Washers 24 and 124 may be of any suitable shape. Washer 124 is rectangular in FIG. 6, but washer 24 is diamond-shaped in FIG. 3 so that washers 24 can be located closer together.

The invention may be embodied in other specific forms without departure from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by the U.S. Letters Patent is:

1. An assembly, comprising:
   (a) two members, and
   (b) a joint connecting said members,
   (c) said joint comprising:
      (1) a mortise on one of said members assembled over a tenon on another of said members,
      (2) a washer telescoped over the distal end of the tenon against the member containing said mortise, and
      (3) a weld securing said tenon to said washer for securing said members together;
   (d) said tenon and washer being made of metallic, weldable material.

2. An assembly, comprising:
   (a) two sheet members formed of heat conductive material having surfaces discolorable by the heat of welding,
   (b) one of said members having a slot integrally formed therein,
   (c) the other said members having an integral projection therefrom having a cross sectional shape approximately the same as but smaller than said slot but of a width less than said other member so as to define a shoulder on said other member adjacent said projection abutting against said one member as the projection extends through said slot,
   (d) a washer telescoped over a distal end of said projection against said one member, and
   (e) a weld connecting said projection and said washer on the washer side opposite said one member,
   (f) said washer and projection being formed of heat conductive weldable material, said washer being of sufficient size and constructed so that exposed surfaces on both of said members on the side opposite said washer will not be heat discolored.

3. An assembly, as set forth in claim 2, with:
   (a) said washer having a slot closely straddling said projection,
   (b) said washer having a wing projecting upwardly from one edge of said slot away from said one member,
   (c) said weld joining a zone of said wing and projection,
   (d) the height of said wing zone from said one member inhibiting heat transfer back to the exposed surfaces of said members.

4. An assembly, as set forth in claim 2, with:
   (a) said washer having a slot closely straddling said projection,
   (b) said washer having two wings projecting respectively from opposite edges of said slot away from said one member,
   (c) said weld being a projection weld joining zones of said wings and projection,
   (d) the height of said wing zones from said one member inhibiting heat transfer back to the exposed surfaces of said members.

References Cited by the Examiner

UNITED STATES PATENTS

| 943,370 | 12/09 | Prahar | 189—76 |
| 1,388,644 | 8/21 | Herbest. | |
| 1,484,579 | 2/24 | Still. | |
| 2,194,388 | 3/40 | Haugh. | |
| 2,913,950 | 11/59 | Tinnerman | 85—36 X |

HARRISON R. MOSELEY, *Primary Examiner.*

N. ANSHER, *Examiner.*